US012658033B2

(12) United States Patent
Kimura et al.

(10) Patent No.: US 12,658,033 B2
(45) Date of Patent: Jun. 16, 2026

(54) FOREIGN SUBSTANCE DETECTION SYSTEM AND VEHICLE

(71) Applicants: TOYOTA JIDOSHA KABUSHIKI KAISHA, Toyota (JP); DENSO CORPORATION, Kariya (JP)

(72) Inventors: Kazutaka Kimura, Mishima (JP); Toshiya Hashimoto, Miyoshi (JP); Tomokiyo Suzuki, Tagata-gun (JP); Kazuyoshi Obayashi, Aichi (JP); Keisuke Tani, Aichi (JP); Nobuhisa Yamaguchi, Aichi (JP); Masaki Kanesaki, Aichi (JP); Yuichi Takemura, Aichi (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 15 days.

(21) Appl. No.: 18/851,139

(22) PCT Filed: Feb. 28, 2023

(86) PCT No.: PCT/JP2023/007253
§ 371 (c)(1),
(2) Date: Sep. 26, 2024

(87) PCT Pub. No.: WO2023/210147
PCT Pub. Date: Nov. 2, 2023

(65) Prior Publication Data

US 2025/0209910 A1 Jun. 26, 2025

(30) Foreign Application Priority Data

Apr. 27, 2022 (JP) ................................ 2022-073384

(51) Int. Cl.
*G08G 1/01* (2006.01)
*G07C 5/00* (2006.01)

(52) U.S. Cl.
CPC ........... *G08G 1/0133* (2013.01); *G07C 5/006* (2013.01); *G07C 5/008* (2013.01); *G08G 1/0112* (2013.01)

(58) Field of Classification Search
CPC ...... G08G 1/0133; G08G 1/0112; G08G 1/00; G08G 1/01; G08G 1/13; G07C 5/006; G07C 5/008
See application file for complete search history.

(56) References Cited

U.S. PATENT DOCUMENTS

2021/0300356 A1* 9/2021 Paudel .................... G01C 21/32
2023/0120095 A1* 4/2023 Horihata .......... G08G 1/096775
701/301

FOREIGN PATENT DOCUMENTS

JP 2019-087076 A 6/2019
JP 2019-185347 A 10/2019
(Continued)

OTHER PUBLICATIONS

Apr. 18, 2023 International Search Report issued in International Patent Application No. PCT/JP2023/007253.

*Primary Examiner* — An T Nguyen
(74) *Attorney, Agent, or Firm* — Oliff PLC

(57) ABSTRACT

A foreign substance detection system includes: a vehicle provided with a detector that detects a foreign substance present on a road on which the vehicle travels; and a server device that determines whether or not the foreign substance actually exists on the road on which the vehicle travels based on a detection result of the detector. Further, the server device evaluates validity of the detection result of the foreign substance by comparing, between a plurality of
(Continued)

vehicles, the detection result of the foreign substance by the detector and information on a position where the foreign substance has been detected.

4 Claims, 7 Drawing Sheets

(56) References Cited

FOREIGN PATENT DOCUMENTS

| | | | |
|---|---|---|---|
| JP | 2021-002953 | A | 1/2021 |
| JP | 2021-117586 | A | 8/2021 |
| JP | 2021-167770 | A | 10/2021 |
| WO | 2021/261228 | A1 | 12/2021 |

* cited by examiner (a)

(b)

(c)

(d)

(e)

FOREIGN SUBSTANCE DETECTION SYSTEM AND VEHICLE

FIELD

The present disclosure relates to a foreign substance detection system and a vehicle.

BACKGROUND

Patent Literature 1 describes a system that transmits a position information request from a discovery vehicle that has detected a fallen object to a surrounding vehicle so as to acquire position information, and transmits a group state notification from the discovery vehicle to a group of surrounding vehicles whose distance to the fallen object is equal to or less than a threshold, so as to notify fallen object information from the discovery vehicle as a server vehicle. In addition, Patent Literature 1 describes that the discovery vehicle periodically requests position information to surrounding vehicles to acquire the position information of the surrounding vehicles. When a distance between the server vehicle and a fallen object is equal to or more than a threshold, a server vehicle update request is transmitted from the discovery vehicle as the server vehicle to a surrounding vehicle closest to the fallen object, so as to update the server vehicle.

CITATION LIST

Patent Literature

Patent Literature 1: Japanese Laid-open Patent Publication No. 2021-117586

SUMMARY

Technical Problem

In a system described in Patent Literature 1, validity of a fallen object detection result is not evaluated. For this reason, there is a possibility that erroneous fallen object detection information is transmitted to surrounding vehicles including following vehicles. When information that there is a fallen object is transmitted to surrounding vehicles although there is actually no fallen object, the surrounding vehicles need to take useless measures such as lane change and stop of power feeding during traveling. Under the circumstances, a technique capable of suppressing transmission of erroneous foreign substance detection information has been expected.

The present disclosure has been made in view of the above problem, and an object thereof is to provide a foreign substance detection system and a vehicle capable of suppressing transmission of erroneous foreign substance detection information.

Solution to Problem

A foreign substance detection system according to the present disclosure includes: a vehicle provided with a detector that detects a foreign substance present on a road on which the vehicle travels; and a server device that determines whether or not the foreign substance actually exists on the road on which the vehicle travels based on a detection result of the detector. Further, the server device evaluates validity of the detection result of the foreign substance by comparing, between a plurality of vehicles, the detection result of the foreign substance by the detector and information on a position where the foreign substance has been detected.

It is desired that the server device evaluates the validity of the detection result of the foreign substance based on a number of vehicles determining that the foreign substance is present and a number of vehicles determining that the foreign substance is absent at the position where the foreign substance has been detected. As a result, a foreign substance detection accuracy can be enhanced.

It is desired that the server device transmits information prompting maintenance of the detector to a vehicle making minority determination. As a result, it is possible to suppress transmission of erroneous foreign substance detection information due to a failure of a detector.

It is desired that the server device evaluates the validity of the detection result of the foreign substance in consideration of weather and illuminance around the vehicle. As a result, it is possible to suppress a decrease in foreign substance detection accuracy due to weather and illuminance around a vehicle.

A vehicle according to the present disclosure includes a detector that detects a foreign substance present on a road on which the vehicle travels. Further, the vehicle notifies, to a server device, a detection result of the foreign substance by the detector and a position where the foreign substance has been detected, the server device determining whether or not the foreign substance actually exists on the road on which the vehicle travels based on the detection result of the detector.

It is desired that the vehicle causes the server device to compare information on the foreign substance between a plurality of vehicles.

It is desired that the vehicle notifies information to the server device, and the server device uses the information to aggregate the detection result of the foreign substance from a plurality of vehicles and evaluate validity of the detection result of the foreign substance based on a number of the vehicles.

It is desired that, based on an aggregation result of the detection result of the foreign substance by the server device, the vehicle receives information prompting maintenance of the detecting device of the vehicle and notifies the information to a user.

It is desired that weather and illuminance detected by the vehicle are notified to the server device in order to cause the server device to evaluate validity of the detection result of the foreign substance in consideration of the weather and the illuminance around the vehicle.

Advantageous Effects of Invention

According to a foreign substance detection system and a vehicle of the present disclosure, validity of foreign substance detection results is evaluated by comparing a foreign substance detection result by a detector and information on a position where the foreign substance has been detected between a plurality of vehicles. Thus, transmission of erroneous foreign substance detection information can be suppressed.

DESCRIPTION OF EMBODIMENTS

Hereinafter, a foreign substance detection system and a vehicle according to an embodiment of the present disclosure will be described in detail with reference to the drawings.

Configuration

First, a configuration of the foreign substance detection system according to the embodiment of the present disclosure will be described with reference to FIGS. 1 to 4.

Figure 1:
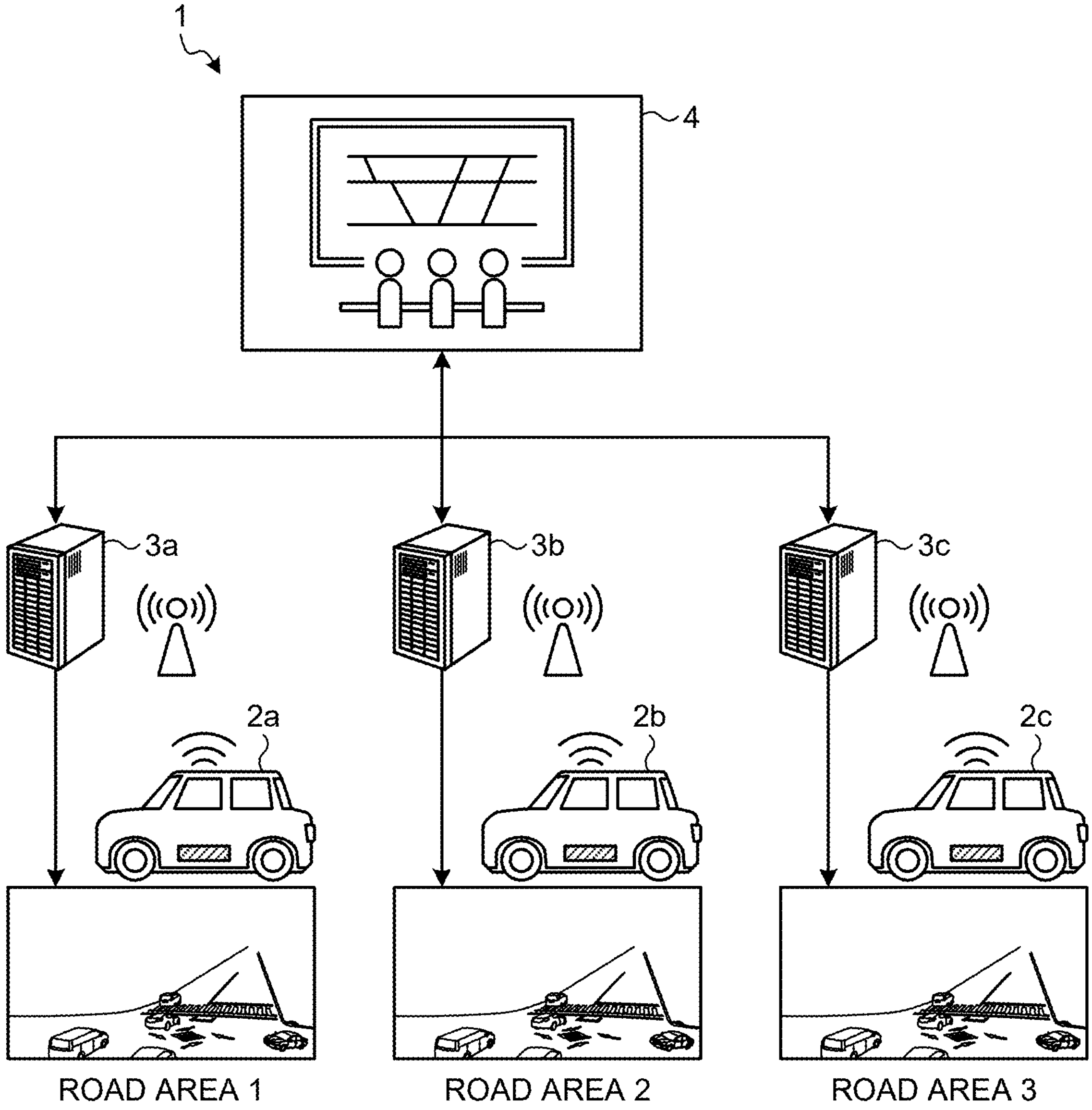
FIG. 1 is a schematic diagram illustrating a configuration of a foreign substance detection system according to an embodiment of the present disclosure.

FIG. 1 is a schematic diagram illustrating the configuration of the foreign substance detection system according to the embodiment of the present disclosure. As illustrated in FIG. 1, a foreign substance detection system 1 according to the embodiment of the present disclosure is a system that detects a foreign substance such as a fallen object present on a road on which a vehicle 2 (2*a* to 2*c*) travels, and includes the vehicle 2, an edge server device 3 (3*a* to 3*c*), and a main server device 4 as main components. However, functions of the edge server device 3 and the main server device 4 may be realized by one information processing apparatus.

Figure 2:
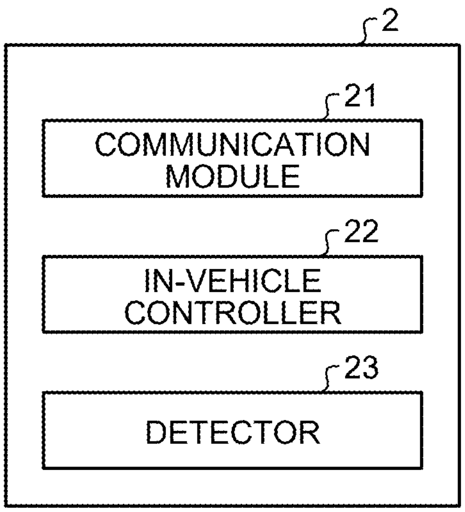
FIG. 2 is a block diagram illustrating a configuration of a vehicle illustrated in FIG. 1.
Figure 3:
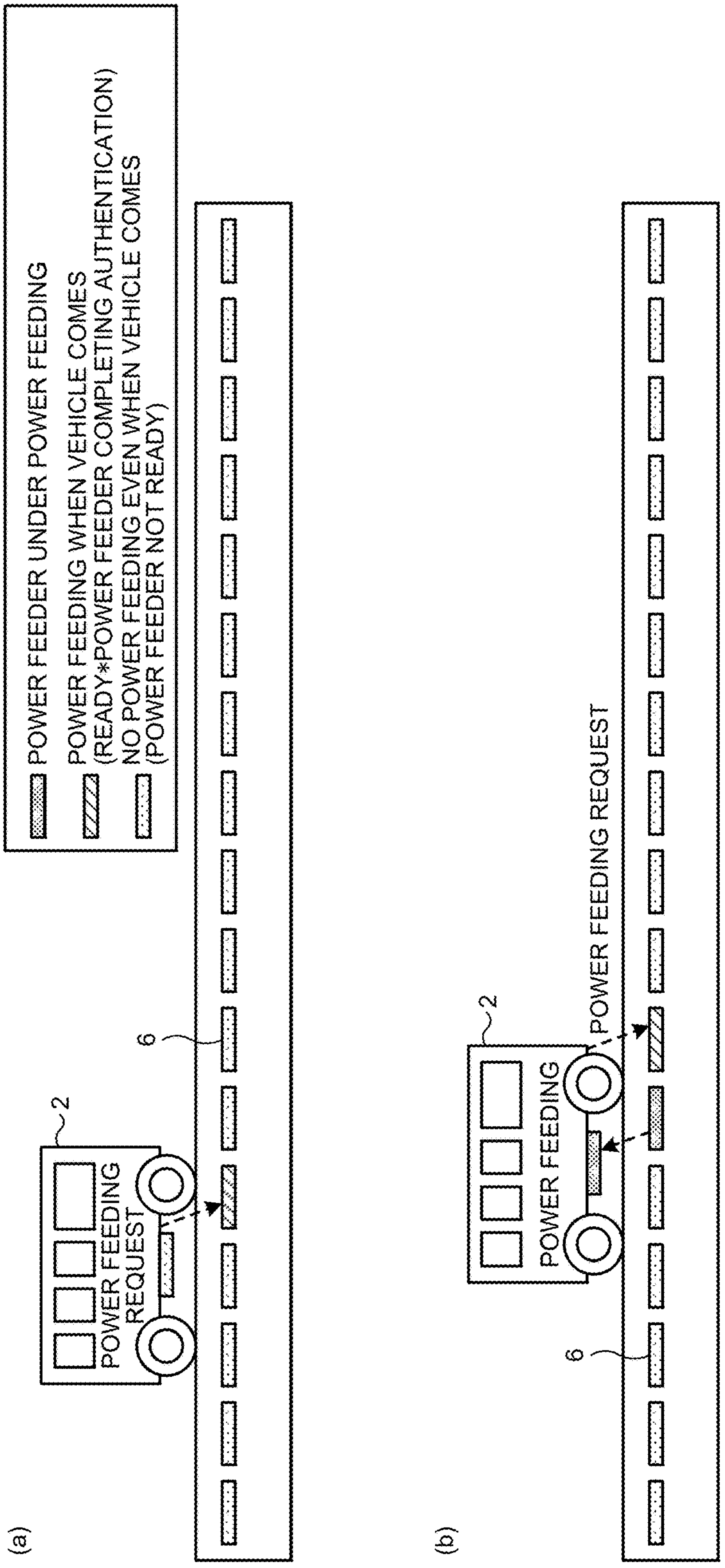
FIG. 3 is a schematic diagram illustrating an example of a power feeding operation of the vehicle.
Figure 4:
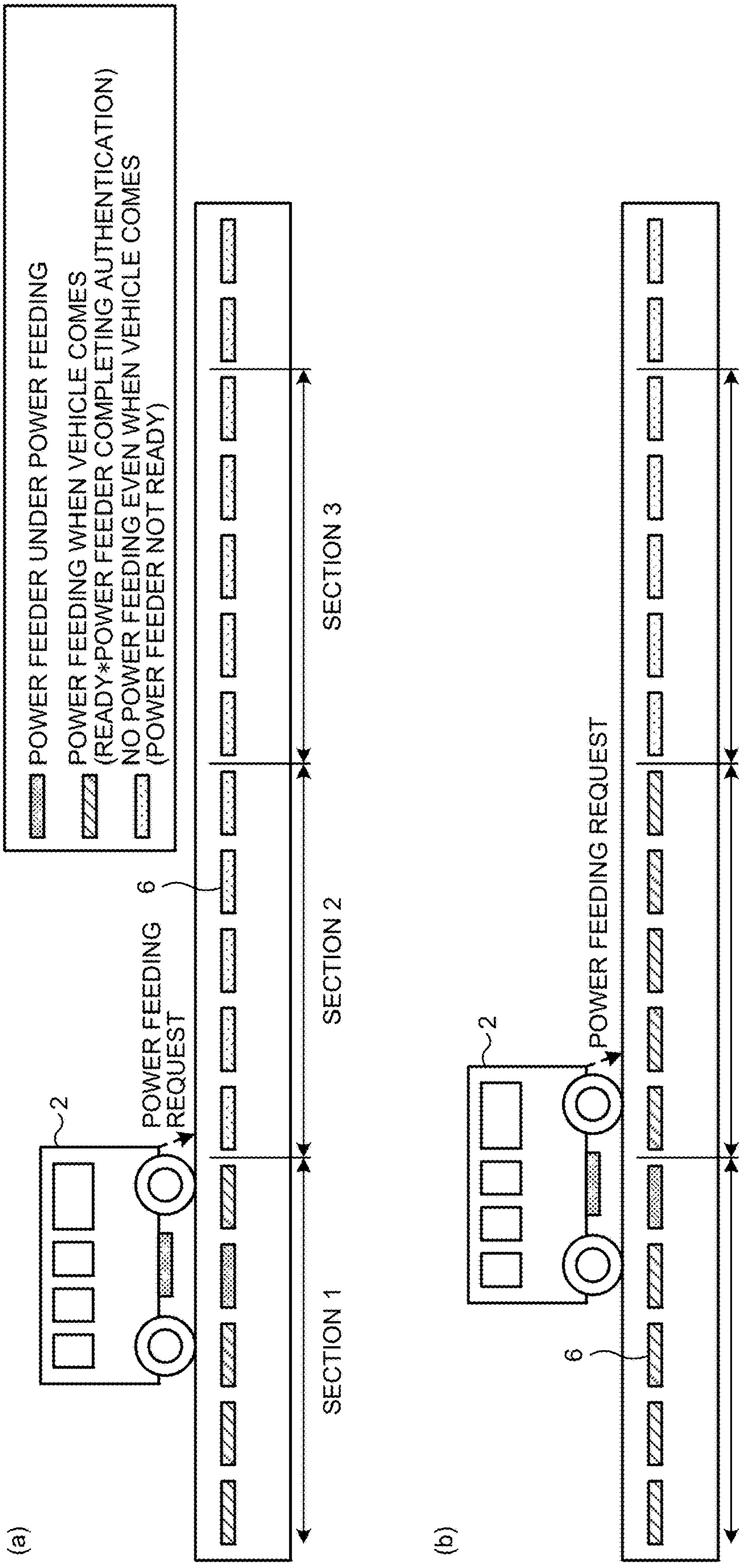
FIG. 4 is a schematic diagram illustrating modification of the power feeding operation of the vehicle.

As illustrated in FIG. 2, the vehicle 2 is a known vehicle such as an electric hybrid vehicle (EHV), a battery electric vehicle (BEV), a plug-in hybrid electric vehicle (PHEV), or a fuel cell electric vehicle (FCEV), and includes a communication module 21, an in-vehicle controller 22, and a detector 23.

The communication module 21 includes a wireless communication circuit capable of executing wireless communication via an electric communication line such as an Internet line network or a mobile phone line network, and controls information communication with the edge server device 3.

The in-vehicle controller 22 includes a processor such as a central processing unit (CPU) having hardware, a digital signal processor (DSP), and a field-programmable gate array (FPGA), and a main storage unit such as a random access memory (RAM) and a read only memory (ROM). The in-vehicle controller 22 controls the operation of the entire vehicle 2 by executing a computer program stored in the main storage unit. In the present embodiment, identification information (vehicle ID) unique to each vehicle 2 is stored in the main storage unit.

The detector 23 includes a device such as a light detection and ranging (LiDAR), a camera, or a millimeter wave radar, and detects a foreign substance present around the vehicle 2. The detector 23 outputs information on a detected foreign substance and its position (longitude, latitude, and the like) to the in-vehicle controller 22 as foreign substance detection information. In addition, the detector 23 acquires information on weather and illuminance around the vehicle 2, using a raindrop sensor and an illuminance sensor, as surrounding environment information, and outputs the surrounding environment information acquired to the in-vehicle controller 22.

In the present embodiment, the vehicle 2 is configured to be capable of power feeding from a power feeder provided on a road. Specifically, as illustrated in parts (a) and (b) of FIG. 3, the vehicle 2 individually transmits a power feeding request to a power feeder 6 provided on the road, and the power feeder 6 that has received the power feeding request executes an authentication process of the vehicle 2. When the vehicle 2 is authenticated, the power feeder 6 performs a power feeding process on the vehicle 2. Instead of the vehicle 2 individually transmitting the power feeding request to the power feeder 6, as illustrated in parts (a) and (b) of FIG. 4, the vehicle 2 may sequentially transmit the power feeding request to sections configured with a plurality of power feeders 6. When the vehicle 2 is authenticated, the power feeder 6 in each section may sequentially perform the power feeding process on the vehicle 2.

Returning to FIG. 1, the edge server device 3 includes an information processing apparatus such as a workstation. The edge server device 3 acquires the vehicle ID, the foreign substance detection information, and the surrounding environment information from the vehicle 2, via the electric communication line, for each road area where the vehicle 2 travels, and transmits the information acquired to the main server device 4.

The main server device 4 includes an information processing apparatus such as a workstation arranged in an information management center side that operates the foreign substance detection system 1. The main server device 4 acquires the vehicle ID, the foreign substance detection information, and the surrounding environment information of each vehicle 2 from the edge server device 3 via the electric communication line, and determines whether there is a foreign substance on the road based on the information acquired. Then, the main server device 4 transmits various types of information, based on a determination result, via the edge server device 3, to an administrator who manages the vehicle 2 and the power feeder 6.

In the foreign substance detection system 1 having the above configuration, the edge server device 3 and the main server device 4 execute the following foreign substance detection process to suppress distribution of erroneous foreign substance detection information. Hereinafter, operations of the edge server device 3 and the main server device 4 when executing the foreign substance detection process will be described with reference to FIGS. 5 to 7.

Foreign Substance Detection Process

Figure 5:
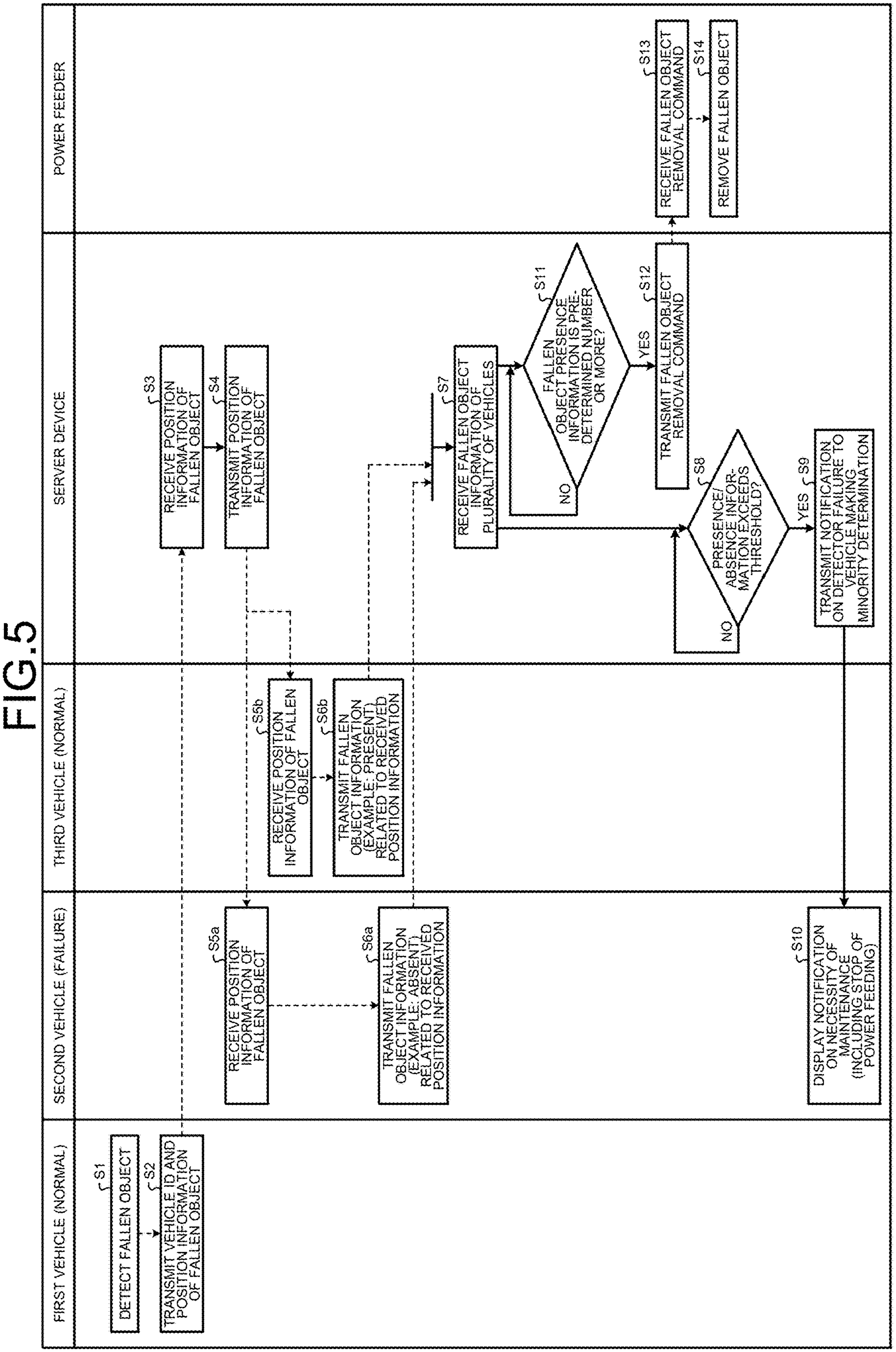
FIG. 5 is a flowchart illustrating a foreign substance detection process flow according to the embodiment of the present disclosure.
Figure 6:
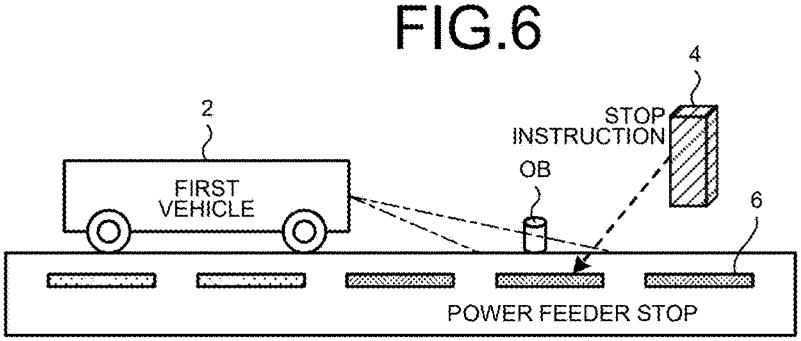
FIG. 6 is a schematic diagram illustrating an example of a foreign substance detection process according to the embodiment of the present disclosure.
Figure 6:
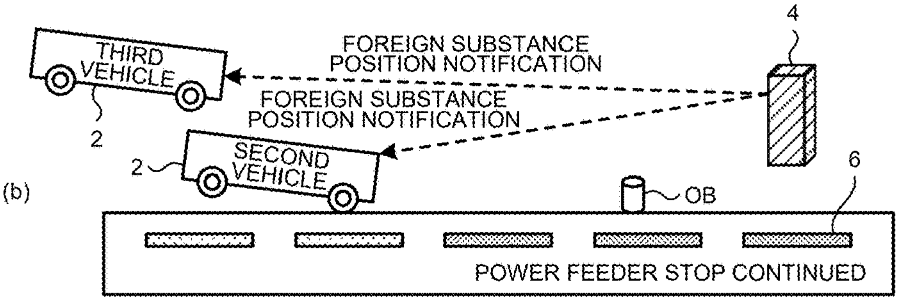
Figure 6:
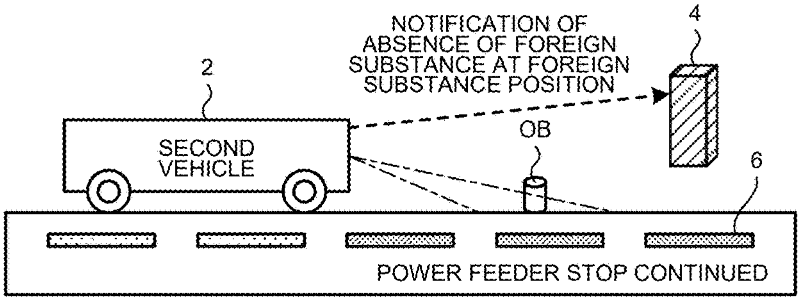
Figure 6:
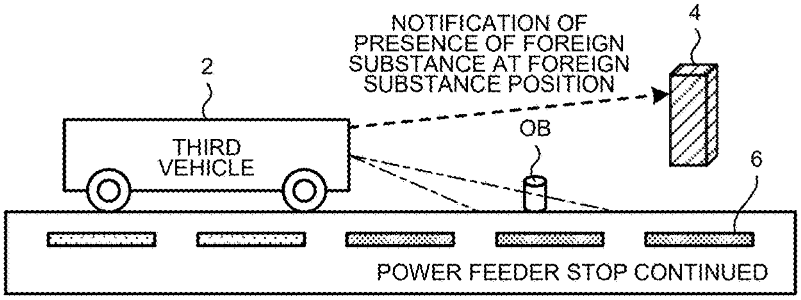
Figure 6:
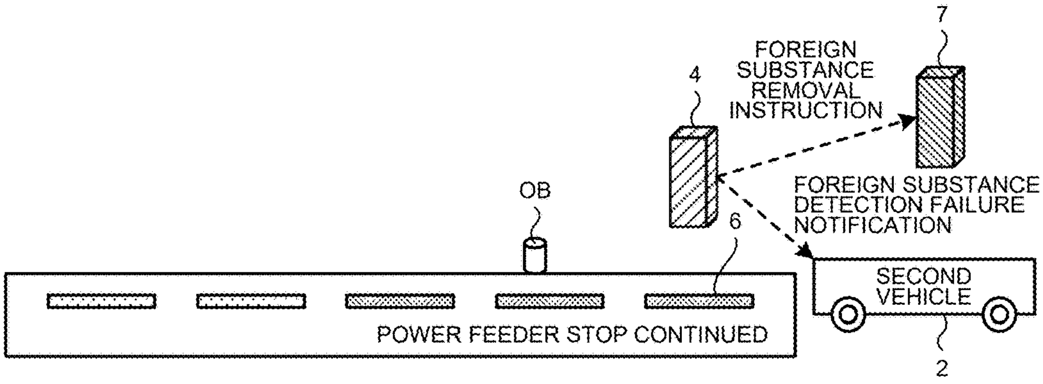

FIG. 5 is a flowchart illustrating a flow of the foreign substance detection process according to the embodiment of the present disclosure. The foreign substance detection process illustrated in FIG. 5 is a process when there is actually a fallen object OB on the road, and a first vehicle 2 out of three vehicles 2 detects the fallen object OB but the detector 23 of a second vehicle 2 is out of order.

In the foreign substance detection process illustrated in FIG. 5, first, when the detector 23 of the first vehicle 2 detects the fallen object OB (Step S1), the in-vehicle controller 22 of the first vehicle 2 transmits the position information of the fallen object OB together with its own vehicle ID to the main server device 4 via the edge server device 3 (Step S2). Next, upon receiving the position information of the fallen object OB transmitted from the first vehicle 2 (Step S3), the main server device 4 stops the operation of the power feeder 6 near a position indicated by the position information of the fallen object OB, and also transmits the received position information of the fallen object OB to the second and third vehicles 2 (foreign substance position notification) (Step S4, parts (a) and (b) of FIG. 6).

Next, the second and third vehicles 2 receive the position information of the fallen object OB transmitted from the main server device 4 via the edge server device 3 (Steps S5*a* and S5*b*), and transmit a detection result of the fallen object OB at the position indicated by the received position information to the main server device 4 (Steps S6*a* and 6*b*). As described above, in the present example, since the detector 23 of the second vehicle 2 is out of order, the second vehicle 2 transmits information that there is no fallen object OB at the position indicated by the position information, and the third vehicle 2 transmits information that there is the fallen object OB at the position indicated by the position information (parts (a) and (b) of FIG. 6).

Next, the main server device 4 receives detection results of the fallen object OB transmitted from a plurality of vehicles 2 (Step 37), and determines whether or not the number of vehicles 2 determining presence or absence of the fallen object OB at the position indicated by the position information exceeds a predetermined threshold (Step 38). Then, as a result of the determination, when the number of vehicles 2 determining presence or absence of the fallen object OB at the position indicated by the position information exceeds the predetermined threshold (Step S8: Yes), the main server device 4 transmits a notification, to the vehicle 2 making minority determination, that there is a failure in the detector 23 via the edge server device 3 (Step S9), and the vehicle 2 that has received the notification displays information such as necessity of maintenance of the detector 23 (Step S10). In this example, the second vehicle 2 receives the notification, and displays the information such as necessity of maintenance of the detector 23 (Part (e) of FIG. 6). A foreign substance detection accuracy by the detector 23 changes according to weather or illuminance around the vehicle 2. Therefore, the predetermined threshold may be changed according to the weather or illuminance around the vehicle 2.

In parallel with the process in Step S8, the main server device 4 determines whether the number of vehicles 2 determining that there is the fallen object OB at the position indicated by the position information is equal to or more than a predetermined number (Step S11). Then, as a result of the determination, when it is determined that the number of vehicles 2 determining that there is the fallen object OB at the position indicated by the position information is equal to or more than the predetermined number (Step S11: Yes), the main server device 4 determines that the fallen object OB is reliably present at the position indicated by the position information, and transmits information instructing removal of the fallen object OB to a control device 7 controlling the power feeder 6 (Step S12). Then, when the control device 7 receives the information instructing removal of the fallen object OB (Step S13), the control device 7 gives an instruction to a worker to remove the fallen object OB (Step S14). The foreign substance detection accuracy by the detector 23 changes according to the weather or illuminance around the vehicle 2. Therefore, the predetermined number may be changed according to the weather or illuminance around the vehicle 2. In addition, the determination result may be weighted between the vehicles 2. For example, determination by the vehicle 2 having the detector 23 provided with a large number of sensors may be given a larger weight.

As is clear from the above description, in the foreign substance detection system 1 according to the embodiment of the present disclosure, the main server device 4 evaluates the validity of the detection result of the foreign substance by comparing, between the plurality of vehicles 2, the foreign substance detection result by the detector 23 and the information on the position where the foreign substance has been detected. As a result, it is possible to suppress transmission of erroneous foreign substance detection information. In addition, the main server device 4 evaluates the validity of the foreign substance detection result based on the number of vehicles 2 determining that there is the foreign substance and the number of vehicles 2 determining that there is no foreign substance at the position where the foreign substance has been detected. As a result, the foreign substance detection accuracy can be enhanced. Still more, since the main server device 4 transmits information prompting maintenance of the detector 23 to the vehicle 2 making minority determination, it is possible to suppress transmission of erroneous foreign substance detection information due to a failure of the detector 23. Furthermore, since the main server device 4 evaluates the validity of the foreign substance detection result in consideration of the weather and illuminance around the vehicle 2, it is possible to suppress a decrease in the foreign substance detection accuracy due to the weather or illuminance around the vehicle.

Figure 7:
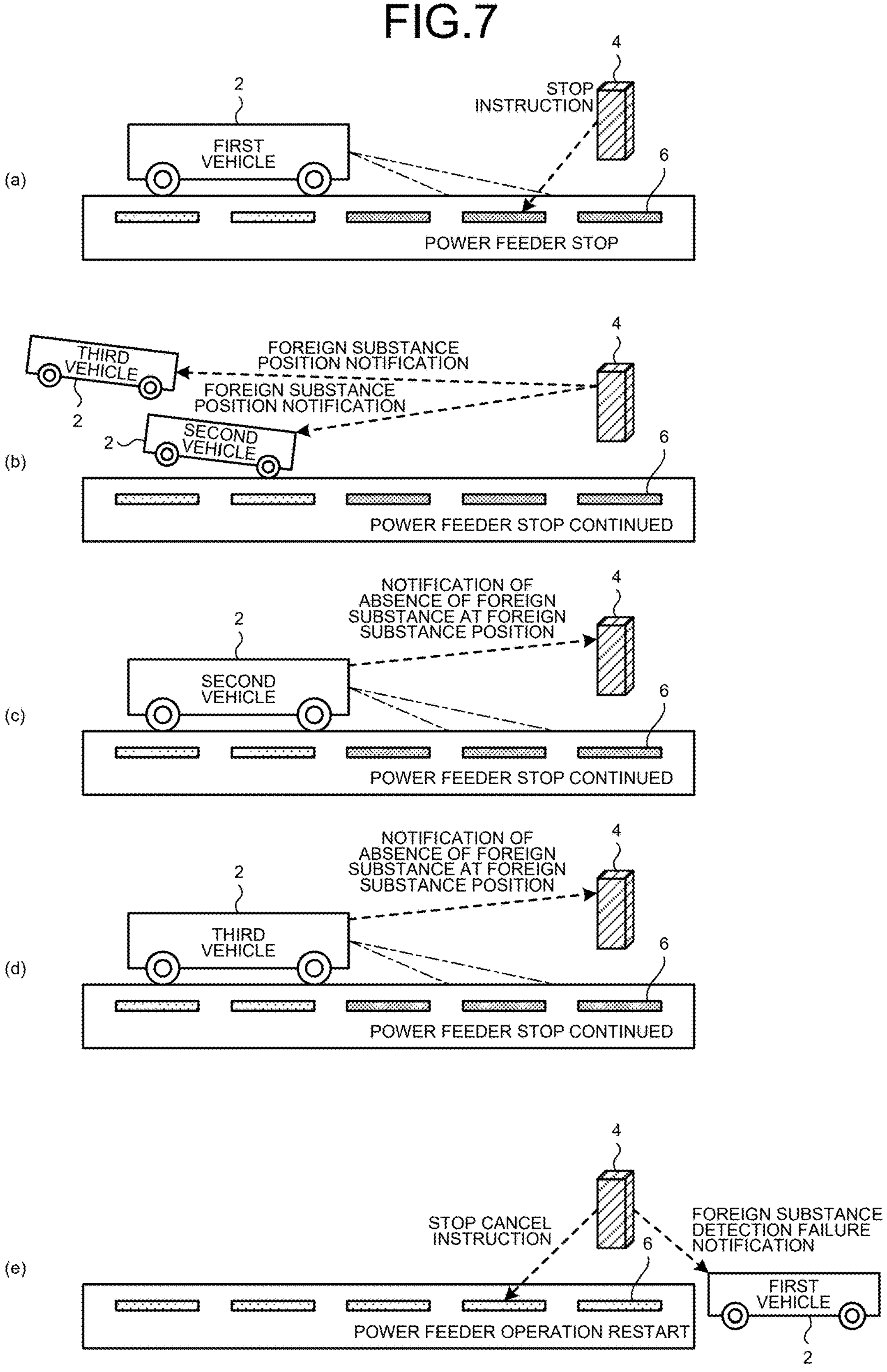
FIG. 7 is a schematic diagram illustrating another example of the foreign substance detection process according to the embodiment of the present disclosure.

The foreign substance detection process described above is a process performed when a foreign substance is present on the road, and the first vehicle 2 out of the three vehicles 2 detects the foreign substance but the detector 23 of the second vehicle 2 is out of order. However, as illustrated in FIG. 7, the foreign substance detection process may be similarly performed when there is actually no foreign substance on the road, and the first vehicle 2 out of the three vehicles 2 determines that the foreign substance is present. In other words, in this case, as illustrated in part (a) of FIG. 7, first, when the detector 23 of the first vehicle 2 detects the fallen object OB that does not actually exist, the in-vehicle controller 22 of the first vehicle 2 transmits the position information of the fallen object OB together with its own vehicle ID to the main server device 4 via the edge server device 3. Next, upon receiving the position information of the fallen object OB transmitted from the first vehicle 2, the main server device 4 stops the operation of the power feeder 6 near the position indicated by the position information of the fallen object OB and transmits the received position information of the fallen object OB to the second and third vehicles 2 (Part (b) of FIG. 7). Next, the second and third vehicles 2 receive the position information of the fallen object OB transmitted from the main server device 4 via the edge server device 3, and transmit the detection result of the fallen object OB at the position indicated by the received position information to the main server device 4. As described above, since the foreign substance does not exist on the road, the second and third vehicles 2 transmit information that the fallen object OB is absent at the position indicated by the received position information (Parts (c) and (d) of FIG. 7). Thereafter, the main server device 4 executes a process similar to the foreign substance detection process described above. In this example, information such as necessity of maintenance of the detector 23 is displayed on the first vehicle 2. In addition, since there is actually no fallen object OB, the operation of the power feeder 6 that has been stopped is restarted.

The foreign substance detection accuracy by the detector 23 changes according to the weather or time zone. For example, there is a difference in the foreign substance detection accuracy between when it is sunny in daytime and when it is rainy at night. Therefore, the number of times (count value) that the detector 23 detects a foreign substance at the same place may be changed according to the weather or time zone. For example, as shown in Table 1, a weight of the count value of each detector 23 according to detection results of the raindrop sensor and the illuminance sensor (e.g., weight of a count value of LiDAR is 1 when the weather around the vehicle 2 is rainy) may be set, and the main server device 4 may execute the process in Step S8 and Step S11 using the weighted count value. As a detection range of the detector 23, it is also possible to distinguish a range that hinders a vehicle travel or power feeding from other ranges. For example, whether or not a foreign substance exists in a travel range may be determined by image recognition or the like. When it can be determined that power feeding is not hindered, such as a fallen object on a roadside, the power feeding may be continued.

TABLE 1

| | Raindrop sensor | | Illuminance sensor | |
|---|---|---|---|---|
| Type | Sunny to cloudy | Rainy | Light | Dark |
| LiDAR | 3 | 1 | 3 | 3 |
| Camera | 3 | 1 | 3 | 1 |
| Millimeter wave radar | 2 | 2 | 2 | 2 |

Specifically, in an example illustrated in Table 1, the count value of the detector 23 may be obtained by the following Mathematical Formula 1 or Mathematical Formula 2, where the LiDAR has a count value D1, the camera has a count value D2, the millimeter wave radar has a count value D3, detection by the raindrop sensor is given a weight S1, and a detection result of the illuminance sensor is given a weight S2.

[Mathematical formula 1]

$$H = D1(S1+S2)+D2(S1+S2)+D3(S1+S2) \quad (1)$$

[Mathematical formula 2]

$$H = D1 \text{ or } D2 \text{ or } D3(S1+S2) \quad (2)$$

Although the embodiments to which the disclosure by the present inventors is applied have been described above, the present disclosure is not limited by the description and drawings of a part of the disclosure of the present disclosure according to the present embodiments. In other words, other embodiments, examples, operation techniques, and the like made by those skilled in the art based on the present embodiments are all included in the scope of the present invention.

INDUSTRIAL APPLICABILITY

According to the present disclosure, it is possible to provide a foreign substance detection system and a vehicle capable of suppressing transmission of erroneous foreign substance detection information.

REFERENCE SIGNS LIST

1 Foreign Substance Detection System
2, 2*a*, 2*b*, 2*c* Vehicle
3, 3*a*, 3*b*, 3*c* Edge Server Device
4 Main Server Device
6 Power Feeder
7 Control Device
21 Communication Module
22 In-Vehicle Controller
23 Detector
OB Fallen Object

The invention claimed is:

1. A foreign substance detection system comprising:

a first vehicle provided with (i) a detector configured to detect a foreign substance present on a road on which the vehicle travels and (ii) a transmitter configured to transmit a detection result of the detector externally of the vehicle; and a server device configured to receive the detection result transmitted by the first vehicle and determine whether or not the foreign substance actually exists on the road on which the first vehicle travels based on the detection result of the detector, wherein the server device evaluates validity of the detection result of the foreign substance by comparing, between a plurality of vehicles including the first vehicle, the detection result of the foreign substance by the detector and information on a position where the foreign substance has been detected, and the server device (1) upon receiving the detection result from the first vehicle indicating that the foreign substance exists at the position on the road, stops operation of a power supply device that is present in the road adjacent to the position where the foreign substance was detected, and (2) after evaluating the validity of the detection result and determining that the detection result is invalid, restarts the operation of the power supply device that is present in the road adjacent to the position where the foreign substance was detected.

2. The foreign substance detection system according to claim 1, wherein the server device evaluates the validity of the detection result of the foreign substance based on a number of the vehicles determining that the foreign substance is present at the position and a number of the vehicles determining that the foreign substance is absent at the position where the foreign substance has been detected by the first vehicle.

3. The foreign substance detection system according to claim 2, wherein the server device transmits information prompting maintenance of the detector to (a) the vehicles that determined that the foreign substance is present at the position when the number of the vehicles determining that the foreign substance is present at the position is less than the number of the vehicles determining that the foreign substance is absent at the position and (b) the vehicles that determined that the foreign substance is absent at the position when the number of the vehicles determining that the foreign substance is absent at the position is less than the number of the vehicles determining that the foreign substance is present at the position.

4. The foreign substance detection system according to claim 1, wherein the server device evaluates the validity of the detection result of the foreign substance in consideration of weather and illuminance around the first vehicle.

* * * * *